United States Patent
Nagatsuka et al.

(10) Patent No.: US 6,548,823 B2
(45) Date of Patent: Apr. 15, 2003

(54) MEDICAL IMAGE READING APPARATUS

(75) Inventors: Sumiya Nagatsuka, Sayama (JP); Eiichi Akagi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/777,690

(22) Filed: Feb. 7, 2001

(65) Prior Publication Data

US 2001/0011713 A1 Aug. 9, 2001

(30) Foreign Application Priority Data

Feb. 8, 2000 (JP) .......................... 2000-030311

(51) Int. Cl.[7] .............................................. G03B 42/02
(52) U.S. Cl. ...................................................... 250/584
(58) Field of Search ............................... 250/581, 584; 345/700

(56) References Cited

U.S. PATENT DOCUMENTS

| | | | | |
|---|---|---|---|---|
| 3,859,527 A | | 1/1975 | Luckey | |
| 4,789,782 A | * | 12/1988 | Ohara | 250/583 |
| 4,864,132 A | * | 9/1989 | Adachi et al. | 250/584 |
| 5,270,530 A | * | 12/1993 | Godlewski et al. | 250/208.1 |
| 5,420,975 A | * | 5/1995 | Blades et al. | 345/811 |

FOREIGN PATENT DOCUMENTS

JP  55-012144  1/1980

* cited by examiner

*Primary Examiner*—Constantine Hannaher
*Assistant Examiner*—Shun Lee
(74) *Attorney, Agent, or Firm*—Finnegan, Henderson, Farabow, Garrett & Dunner, L.L.P.

(57) ABSTRACT

A medical image reading apparatus comprises a controller to conduct an operation control on one of a first operation mode to execute reading a medical image after order information with regard to the reading the medical image is inputted and a second operation mode to execute reading a medical image before the order information with regard to the reading the medical image is inputted; and a reader to conduct the reading the medical image based on the operation control by the controller.

19 Claims, 9 Drawing Sheets

FIG. 5

| MODE UTILITY | SELECT CONDITION KEY | | ID | | FULL NAME | | CANCEL | CONFIRMATION |
|---|---|---|---|---|---|---|---|---|
| | | | | | | | ELIMINATION | |
| 01 | SKULL | A→P | | | | | NEXT PAGE | |

| | PAGE | HEAD REGION | NECK REGION | CHEST REGION | ABDOMINAL REGION | BACKBONE | CHEST REGION |
| --- | --- | --- | --- | --- | --- | --- | --- |
| | 1 PAGE | UPPER LIMB | LOWER LIMB | NEWBORN BABY | TEST | | |

| SKULL | A→P | P→A | LAT | | | | 3 WAYS |
| --- | --- | --- | --- | --- | --- | --- | --- |
| SKULL | TAUN | SKULL BOTTOM | | | | | |
| SELLA TURSICA | A→P | LAT | | | | | |
| PARANASAL SINUS | P→A | UOTAAZU | KOORUD OWERU | LAT | | | 2 WAYS |
| ACOUSTIC ORGAN | SHURAA | SUTEMBAASU | ZONENKA RUBU | INTERNAL ACOUSTIC MEATUS | | | 2 WAYS |
| OPTIC CANAL | REEZE | | | | | | |

PREVIOUS PAGE

NEXT PAGE

FIG. 6

| MODE UTILITY | | SELECT CONDITION KEY | ID | FULL NAME | CONFIRMATION | CANCEL |
|---|---|---|---|---|---|---|

| 01 | SKULL | A→P | | | | ELIMINATION |
|---|---|---|---|---|---|---|
| | | | | | | NEXT PAGE |

| PAGE | HEAD REGION | NECK REGION | CHEST REGION | ABDOMINAL REGION | BACKBONE | CHEST REGION |
|---|---|---|---|---|---|---|
| PAGE 1 | UPPER LIMB | LOWER LIMB | NEWBORN BABY | TEST | | |

| SKULL | A→R | P→A | LAT | | | | 3 WAYS |
|---|---|---|---|---|---|---|---|
| SKULL | TAUN | SKULL BOTTOM | | | | | |
| SELLA TURSICA | A→P | LAT | | | | | |
| PARANASAL SINUS | P→A | UOTAAZU | KOORUD OWERU | LAT | | | 2 WAYS |
| ACOUSTIC ORGAN | SHURAA | SUTEMBAASU | ZONENKA RUBU | INTERNAL ACOUSTIC MEATUS | | | 2 WAYS |
| OPTIC CANAL | REEZE | | | | | | |

PREVIOUS PAGE

NEXT PAGE

FIG. 7

| MODE UTILITY | | ID | FULL NAME | CONFIRMATION | CANCEL |

SELECT CONDITION KEY

01 SKULL A→P

ELIMINATION
NEXT PAGE

PAGE | HEAD REGION | NECK REGION | CHEST REGION | ABDOMINAL REGION | BACKBONE | CHEST REGION

PAGE 1 | UPPER LIMB | LOWER LIMB | NEWBORN BABY | TEST

SKULL | A→R | P→A | LAT
PARANASAL SINUS | R→A | LAT | UOTAAZU | | 3 WAYS
SELLA TURSICA | A→P | LAT | KOORUD OWERU
SKULL | TAUN | SKULL | | | | 2 WAYS
ACOUSTIC ORGAN | SHURAA | SUTEMBAASU | ZONENKA RUBU | INTERNAL ACOUSTIC MEATUS | | 2 WAYS
OPTIC CANAL | REEZE

PREVIOUS PAGE
NEXT PAGE

MEDICAL IMAGE READING APPARATUS

BACKGROUND OF THE INVENTION

The present invention relates to an apparatus for reading a medical image obtained through radiographing of a subject.

Radiographic images obtained by using X-rays are commonly used as a medical image for diagnoses of a disease. There have been used widely the so-called radiographs which are obtained by applying X-rays transmitted through a subject to a phosphor layer (a fluorescent screen) to produce visible rays, by applying the visible rays to a film employing silver halide in the same way as in the ordinary photography and by developing the film to obtain the radiographic images.

In recent years, however, there have been developed methods wherein images are taken out of a phosphor layer without using a film coated with silver halide. These methods are represented by a method wherein radiations transmitted through a subject are absorbed in a phosphor, then, the phosphor is excited by light or heat energies, for example, so that radiation energies accumulated in the phosphor through the aforesaid absorption may be made to radiate as fluorescence (luminescence), and this fluorescence is converted photoelectrically to obtain image signals.

To be concrete, U.S. Pat. No. 3,859,527 and TOKKAI-SHO No. 55-12144 disclose a method for converting radiographic images wherein a stimulant phosphor is used and visible rays or infrared rays are used as stimulating and exciting light. This method is one wherein a radiographic image conversion panel in which a stimulant phosphor layer is formed on a support is used, radiations transmitted through a subject are applied to the stimulant phosphor layer of the conversion panel to accumulate radiation energies corresponding to radiation transmittance of each region of the subject to form a latent image, and then, the stimulant layer is scanned by the stimulating and exciting light to make the accumulated radiation energies to radiate to be converted into light, and this light signal is converted photoelectrically to obtain a radiographic image signal.

The radiographic image signal thus obtained is outputted on a silver halide film or on CRT as it is or after being subjected to image processing, to be visualized or filed in an electronic filing device.

(First Problem)

Even in the case of urgent radiographing, it is necessary to input order information such as names of regions to be radiographed and image processing conditions about regions to be radiographed before radiographing. Namely, order information such as regions to be radiographed is decided in advance because a level of a signal recorded in a film varies depending on a region to be radiographed, and thereby, reading and image processing are executed at an appropriate signal level from the film. Incidentally, there has been required a long time before the start of actual radiographing, because of necessity to input order information before radiographing. In a medical service site, in particular, there is an occasion where urgent radiographing is required, depending on conditions of a patient, and it is important for an apparatus handling medical images to be capable of coping with urgent rediographing.

There will be explained in detail as follows.

When radiographing in a hospital, a region to be radiographed varies for each radiographing in many cases. For example, there are many cases wherein regions to be radiographed on a body are changed in succession for each radiographing, such as radiographing a chest region after raadiographing an abdominal region. It is usually necessary to optimize a size of radiographing and image processing for each region to obtain optimum image quality and radiographing time. For example, reading conditions and image processing in radiographing of viscera in an abdominal region are greatly different from those in radiographing of thorax bones.

In the case of a patient in emergency, however, radiographing that requires less time and labor of inputting at the sacrifice of optimum size and image processing is preferred, because it is necessary to hurry up. The reason for the foregoing is that operations of several times are needed for inputting the contents stated above.

There is further available a radiographic image system wherein a cassette that houses therein a film is used to radiograph with a radiographing device and a reader is used for reading. In the case of this radiographic image system, when a plurality of cassettes are used, order information input, radiographing and reading are conducted in this order, but radiographing and reading are conducted in a separate apparatus, which results in a problem that correspondence between each cassette and each radiographing is not clear.

In other words, when radiographing by the use of an Xray detection plate housed in a cassette, it is necessary to store the relationship between information of the region radiographed by a radiographer and a cassette housing the plate, until the image that is read through image reading is related with region information concerning the region radiographed, the plate subjected to X-ray exposure is not subjected to image reading as it is. Further, when a plate is registered in advance for the region to be radiographed, it is necessary to store until radiographing of the region to be radiographed and image reading thereof are completed.

However, when a change of image reading conditions for the region to be radiographed is not important, the necessity to input in advance the relationship between the region to be radiographed and a plate, or between the region to be radiographed and a cassette housing therein the plate is low. Therefore, there are some cases where no inputting is desirable from the viewpoint of efficiency.

Further, in some cases in a hospital, doctors in charge take turns depending on a time zone, such as a day of the week, the forenoon and the afternoon. For example, there is a case where doctor A in the internal department takes charge of the most part of chest regions, while doctor B in the department of surgery takes charge of the most part of lumbar vertebrae and appendicular skeleton. In this case, frequency of regions to be radiographed varies depending on the doctor. Therefore, by changing the order of regions to be radiographed on the display screen that is for selecting a region to be radiographed for each day of the week and each time zone, an operator can select the region to be radiographed easily.

(Second Problem)

In the case of radiographing for radiographic images and reading of images obtained through radiographing, it is necessary for an operator to input operation procedures concerning the radiographing and reading from an operation section.

On the conventional apparatus in general, there is provided an input means that is composed of a detection means such as a touch panel which detects key input and of a display means such as a display in which a touch panel is pasted on the surface for conducting key display corresponding to an input position for key input of the detection means.

Thus, radiographing and reading are executed by the apparatus in accordance with operation procedures inputted by the aforesaid input means.

Incidentally, display of key is in a single color in general, and its arrangement has been specific to the apparatus. Or, the key arrangement has been one established for the apparatus by an operator or a serviceman in advance.

In such a case, it sometimes happens that body parts examined (regions) to be radiographed (head region, neck region, chest region, abdominal region, backbone, upper limb, lower limb, . . . ) for example, amount to 200 types or more. Therefore, one screen is not enough to display, and it has been necessary to search the desired region by advancing pages and thereby by switching screens. Accordingly, operations are complicated, and a long time has been required for searching the desired region and deciding it. Further, it can also be considered to display on one screen on a tabulated and thumbnailed display basis, which, however, is not easy to use.

In addition, for other items wherein many selection items are present, similar problems have been caused in the same way as in regions to be radiographed.

Incidentally, even in the case where an operator has set the desired key arrangement, when an item having a high frequency of usage is changed with the lapse of time and with a change in the state of usage, it is impossible to conduct efficient input unless the key arrangement is made, which has been a problem. Namely, a function like a learning function is not provided.

When conducting setting, it is necessary to obtain by calculating regions to be radiographed and frequency of usage. Further, it is naturally thought that regions to be radiographed and frequency of usage are changed for each month, each week and each day of the week. However, simple calculation of frequency has made it impossible to cope with the detailed state (frequency of the specific item goes up at the end of the month).

SUMMARY OF THE INVENTION

The invention has been achieved in view of the first problem stated above, and its first object is to realize a medical image reading apparatus wherein a period of time by input of order information up to the start of radiographing can be shortened and order information can be inputted by grasping contents of a plurality of cassettes which have been subjected to radiographing.

An object is to provide a medical image reading apparatus which requires less time and labor and can read quickly the images resulted from radiographing, in case of emergency. Namely, an object is to provide a medical image reading apparatus which can read images resulted from radiographing with operations requiring less time and labor in case of emergency, while being capable of radiographing usually at optimum image quality and radiographing time.

The invention has been achieved in view of the second problem stated above, and its second object is to realize a medical image reading apparatus capable of conducting key input concerning radiographing and reading easily without conducting specific setting.

Further object is to provide a medical image reading apparatus wherein it is possible to select between an operation mode wherein it is possible to use region information when reading images on a plate and an operation mode wherein it is possible to input region information after confirming images on a plate without using region information, when reading images on the plate. Further, an object is to provide a medical image reading apparatus wherein, by designating the region after confirming an image, it is possible to lower chances to conduct image processing based on the region information under the wrong correspondence between the image and the region information, and it is possible to apply image processing optimized for the region and to use the optimum image for diagnosis.

The invention solving the problems stated above is represented by the following structures.

(1-1) A medical image reading apparatus comprises:
  a controller to conduct an operation control on one of a first operation mode to execute reading a medical image after order information with regard to the reading the medical image is inputted and a second operation mode to execute reading a medical image before the order information with regard to the reading the medical image is inputted; and
  a reader to conduct the reading the medical image based on the operation control by the controller.

(1-2) In the medical image reading apparatus of (1-1), the medical image reading apparatus further comprises:
  a radiographing device to conduct radiographing the medical image based on the operation control by the controller.

(1-3) In the medical image reading apparatus of (1-1), the first operation mode is an operation mode to execute reading the medical image after the order information with regard to the reading the medical image is inputted and to further conduct outputting an image of the medical image and the second operation mode is an operation mode to execute reading the medical image before the order information with regard to the reading the medical image is inputted and to further conduct outputting an image of the medical image after displaying the read medical image.

(1-4) In the medical image reading apparatus of (1-1), the reader has a reading region whose size is changeable, and when the reader conducts reading on the second mode, the reader uses the largest usable reading region.

(1-5) In the medical image reading apparatus of (1-1), the medical image reading apparatus further comprises:
  a displaying device to conduct a key display;
  a detector to detect a key input corresponding to the key display; and
  a key display controller to control the key display by the display, wherein the key display controller executes a control to change an arrangement of the key display for each radiographing frequency.

(1-6) In the medical image reading apparatus of (1-5), the key display controller calculates periodically the radiographing frequency in a predetermined period and executes the control to change the arrangement of the key display.

(1-7) In the medical image reading apparatus of (1-6), the key display controller calculates periodically the radiographing frequency for each of at least one of a predetermined month, a predetermined week, a predetermined day of a week and a predetermined time and executes the control to change the arrangement of the key display.

(1-8) In the medical image reading apparatus of (1-5), the medical image reading apparatus further comprises:
  a notifying device to notify the change in the arrangement of the key display, wherein the notifying device notifies the change in the arrangement of the key display when the key display controller executes the control to change the arrangement of the key display.

(1-9) In the medical image reading apparatus of (1-1), the medical image reading apparatus further comprises:

a displaying device to conduct a key display;

a detector to detect a key input corresponding to the key display; and a key display controller to control the key display by the display, wherein the key display controller executes a control to change a color display of the key display for each radiographing frequency.

(1-10) In the medical image reading apparatus of (1-9), the key display controller calculates periodically the radiographing frequency in a predetermined period and executes the control to change the color display of the key display.

(1-11) In the medical image reading apparatus of (1-10), the key display controller calculates periodically the radiographing frequency for each of at least one of a predetermined month, a predetermined week, a predetermined day of a week and a predetermined time and executes the control to change the color display of the key display.

(1-12) In the medical image reading apparatus of (1-9), the medical image reading apparatus further comprises:

a notifying device to notify the change in the color display of the key display, wherein the notifying device notifies the change in the color display of the key display when the key display controller executes the control to change the color display of the key display.

(1-13) In the medical image reading apparatus of (1-1), the medical image reading apparatus further comprises:

a displaying device to conduct a key display;

a detector to detect a key input corresponding to the key display; and a key display controller to control the key display by the display, wherein the key display controller executes a control to change a color display of the key display for each group of sections to be radiographed.

(1-14) In the medical image reading apparatus of (1-1), the medical image reading apparatus further comprises:

a displaying device to conduct a key display;

a detector to detect a key input corresponding to the key display; and a key display controller to control the key display by the display, wherein the key display controller executes a control to change a color display of the key display for each reader.

(1-15) In the medical image reading apparatus of (1-1), when the reading is conducted on the second operation mode, a medium sensitivity is used among possible settable sensitivities as a reading sensitivity of the reader.

(1-16) In the medical image reading apparatus of (1-1), in the case that an image processing is conducted after the reading is conducted on the second operation mode, at least one kind of usable image processing is conducted regardless of a section to be radiographed.

(1-17) In the medical image reading apparatus of (1-1), the reader reads fluorescent light of a radiation image emitted from a phosphor sheet by irradiating an exciting beam on the phosphor sheet bearing a latent image of the radiation image, and wherein when the reading is conducted on the second mode, a preliminary reading is firstly conducted in advance to a primary reading so as to obtain information of the radiation image recorded in the phosphor sheet by irradiating an exciting beam weaker than that used in the primary reading, and a reading sensitivity of the primary reading is set based on the information of the radiation image obtained by the preliminary reading.

Further, the above object may be attained by the following preferable structures.

(2-1) A medical image reading apparatus provided with a display means that conducts key display capable of coping with operations of radiographing or reading for a medical image, a control means that controls radiographing or reading for a medical image based on the operations of the radiographing or the reading, and controls key display on the display means, and an executing means that executes radiographing or reading for a medical image based on the control of the control means, wherein the control means executes control to change a display color for key display for each group of regions to be radiographed.

In this invention, it is possible to grasp easily a mass of groups of regions to be radiographed because a display color for key display for each group of regions to be radiographed is changed, and thereby, a region to be radiographed can be discovered easily, which makes operations concerning radiographing and reading easy.

(2-2) A medical image reading apparatus provided with a display means that conducts key display capable of coping with operations of radiographing or reading for a medical image, a control means that controls radiographing or reading for a medical image based on the operations of the radiographing or the reading, and controls key display on the display means, and an executing means that executes radiographing or reading for a medical image based on the control of the control means, wherein the control means executes control to change a display color for key display for each reader.

In this invention, it is possible to grasp easily distinction between a plurality of readers because a display color for key display for reader is changed, and thereby, a reader in a target can be discovered easily, which makes operations concerning radiographing and reading easy.

(2-3) A medical image reading apparatus provided with a display means that conducts key display capable of coping with operations of radiographing or reading for a medical image, a control means that controls radiographing or reading for a medical image based on the operations of the radiographing or the reading, and controls key display on the display means, and an executing means that executes radiographing or reading for a medical image based on the control of the control means, wherein the control means executes control to change a display color for key display for each frequency of radiographing.

In this invention, an item of high frequency is displayed on the forefront screen among a plurality of screens because a display color of key display for each frequency of radiographing is changed, which makes operations concerning radiographing and reading easy.

(2-4) A medical image reading apparatus provided with a detection means that detects key input of operations concerning radiographing or reading for a medical image, a display means that conducts key display corresponding to key input of the detection means, a control means that controls radiographing or reading for a medical image based on the key input and controls key display on the display means, and an executing means that executes radiographing or reading for a medical image based on the control of the control means, wherein the control means executes control to change a display color for key display for each group of regions to be radiographed.

In this invention, it is possible to grasp easily a mass of groups of regions to be radiographed because a display color for key display for each group of regions to be radiographed is changed, and thereby, a region to be radiographed in a target can be discovered easily, which makes key input concerning radiographing and reading to be easy.

(2-5) A medical image reading apparatus provided with a detection means that detects key input of operations concerning radiographing or reading for a medical image, a display means that conducts key display corresponding to key input of the detection means, a control means that controls radiographing or reading for a medical image based on the key input and controls key display on the display means, and an executing means that executes radiographing or reading for a medical image based on the control of the control means, wherein the control means executes control to change a display color for key display for each reader.

In this invention, it is possible to grasp easily distinction between a plurality of readers because a display color for key display for each reader (standing posture/lying posture) is changed, and thereby, a reader in a target can be discovered easily, which makes key input concerning radiographing and reading to be easy.

(2-6) A medical image reading apparatus provided with a detection means that detects key input of operations concerning radiographing or reading for a medical image, a display means that conducts key display corresponding to key input of the detection means, a control means that controls radiographing or reading for a medical image based on the key input and controls key display on the display means, and an executing means that executes radiographing or reading for a medical image based on the control of the control means, wherein the control means executes control to change a display color for key display for each frequency of radiographing.

In this invention, an item of high frequency is displayed on the forefront screen among a plurality of screens because a display color of key display for each frequency of radiographing is changed, which makes key input concerning radiographing and reading to be easy.

(2-7) The medial image reading apparatus according to (2-6) wherein the control means calculates the radiographing frequency in a prescribed period periodically and executes control for changing a key display color.

In this invention, an item of high frequency is displayed on the forefront screen among a plurality of screens in the corresponding prescribed period because a display color of key display for each frequency of radiographing obtained by calculating automatically in a prescribed period of time is changed, which makes key input concerning radiographing and reading to be easy.

(2-8) The medial image reading apparatus according to (2-7) wherein the control means calculates the radiographing frequency periodically for each prescribed month, week, day of the week and time zone and executes control for changing a key display color for each prescribed month, week, day of the week and time zone.

In this invention, a display color of key display for each prescribed month, week, day of the week and time zone is changed under a standard of the radiographing frequency obtained by calculating automatically for each prescribed month, week, day of the week and time zone, and therefore, an item of high frequency is displayed on the forefront screen among a plurality of screens in the aforesaid period, which makes key input concerning radiographing and reading to be easy.

(2-9) A medical image reading apparatus provided with a detection means that detects key input of operations concerning radiographing or reading for a medical image, a display means that conducts key display corresponding to key input of the detection means, a control means that controls radiographing or reading for a medical image based on the key input and controls key display on the display means, and an executing means that executes radiographing or reading for a medical image based on the control of the control means, wherein the control means executes control to change an arrangement for key display for each frequency of radiographing.

In this invention, it is possible to discover a region to be radiographed in a target easily because an arrangement for key display is changed depending on radiographing frequency, which makes key input concerning radiographing and reading to be easy.

(2-10) The medial image reading apparatus according to (2-9) wherein the control means calculates the radiographing frequency in a prescribed period periodically, and executes control for changing an arrangement of key display.

In this invention, an item of high frequency is displayed on the forefront screen among a plurality of screens in the corresponding prescribed period because an arrangement of key display is changed for each frequency of radiographing obtained by calculating automatically in a prescribed period of time, which makes key input concerning radiographing and reading to be easy.

(2-11) The medial image reading apparatus according to (2-10) wherein the control means calculates the radiographing frequency periodically for each prescribed month, week, day of the week and time zone and executes control for changing an arrangement for key display for each prescribed month, week, day of the week and time zone.

In this invention, an arrangement of key display for each prescribed month, week, day of the week and time zone is changed under a standard of the radiographing frequency obtained by calculating automatically for each prescribed month, week, day of the week and time zone, and therefore, an item of high frequency is displayed on the forefront screen among a plurality of screens in the aforesaid period, which makes key input concerning radiographing and reading to be easy.

(2-12) The medial image reading apparatus according to either one of (2-6) and (2-7) wherein a notifying means that notifies a change is provided, and when the control means executes control for changing a key display color based on the radiographing frequency calculated in a prescribed period or time, it is notified by the notifying means.

In this invention, key input concerning radiographing and reading is made to be easy because a display color for key display is changed for each radiographing frequency, and an operator can learn whether a key display is changed or not, because there is provided a function which notifies that a display color for key display has been changed automatically.

(2-13) The medial image reading apparatus according to either one of (2-6) and (2-7) wherein a notifying means that notifies a change is provided, and when the control means executes control for changing an arrangement based on the radiographing frequency calculated in a prescribed period or time, it is notified by the notifying means.

In this invention, key input concerning radiographing and reading is made to be easy because an arrangement for key display is changed for each radiographing frequency, and an operator can learn whether a key display is changed or not, because there is provided a function which notifies that an arrangement for key display has been changed automatically.

(2-14) An medial image reading apparatus that conducts radiographing and reading for a medical image, wherein there is provided a control means that controls operations under either one of a first operation mode to execute radiographing and reading after order information relating to reading is inputted and a second operation mode to execute radiographing and reading before order information relating to reading is inputted.

In this invention, it is possible, in the case of an emergency, to shorten a period of time up to the start of radiographing including a period for inputting order information, by using the second operation mode, because operations are controlled under either one of the first operation mode to execute radiographing and reading after order information relating to reading is inputted and the second operation mode to execute radiographing and reading before order information relating to reading is inputted.

(2-15) An medial image reading apparatus that conducts radiographing, reading and outputting for a medical image, wherein there is provided a control means that controls operations under either one of a first operation mode to execute radiographing, reading and image outputting after order information relating to reading is inputted and a second operation mode to execute radiographing and reading before order information relating to reading is inputted and to output images after the medical images read are confirmed.

In this invention, it is possible to input order information after grasping the contents of a plurality of cassettes subjected to radiographing even when a plurality of cassettes are used, because operations are controlled under either one of the first operation mode to execute radiographing, reading and image outputting after order information relating to reading is inputted and the second operation mode to execute radiographing and reading before order information relating to reading is inputted and to output images after the medical images read are confirmed.

BRIEF DESCRIPTION OF THE DRAWINGS

FIG. 5 is an illustration showing an example of a screen in the present embodiment.

FIG. 6 is an illustration showing an example of a screen in the present embodiment.

FIG. 7 is an illustration showing an example of a screen in the present embodiment.

DETAILED DESCRIPTION OF THE PREFERRED EMBODIMENT

Figure 1:
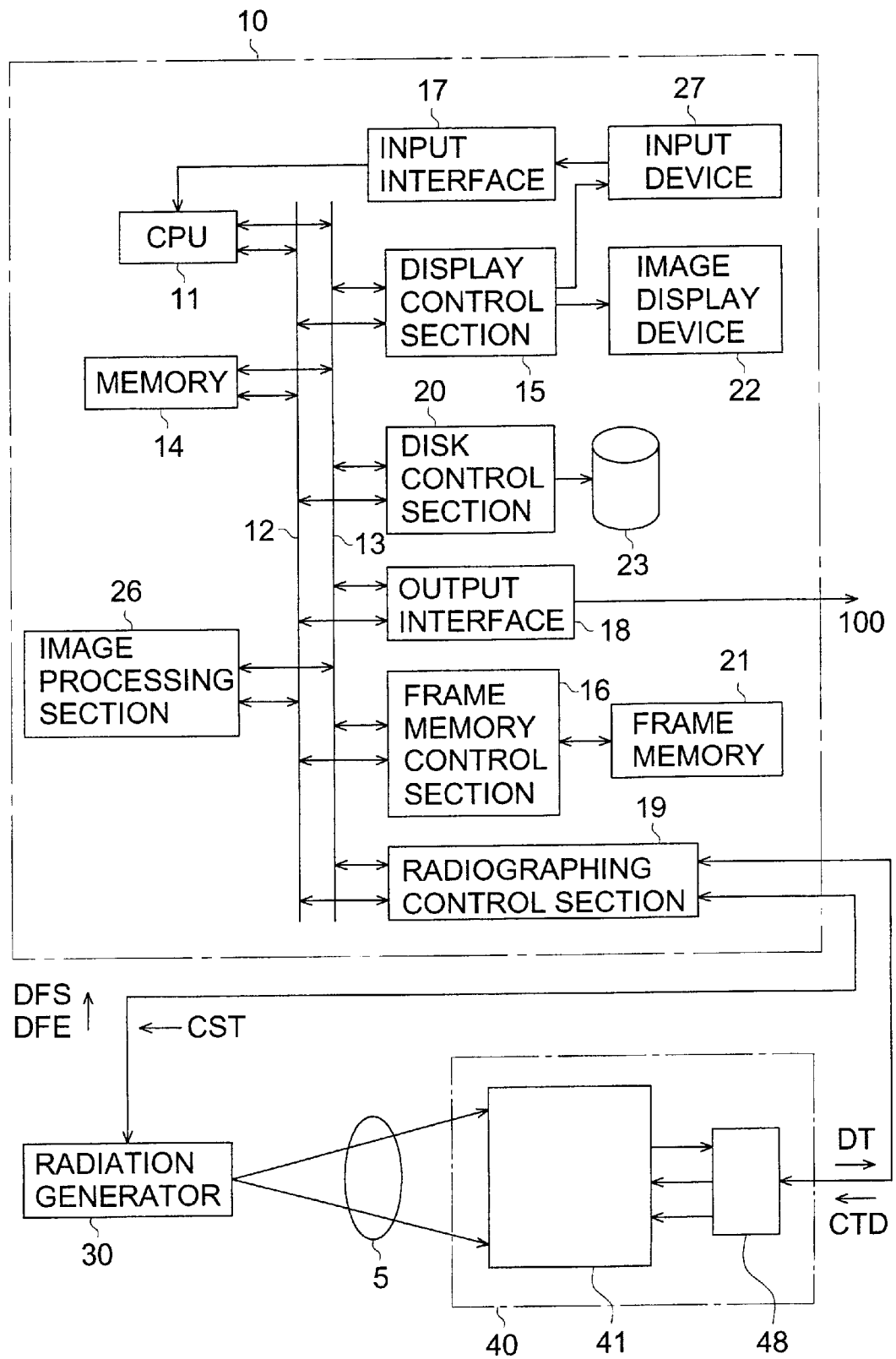
FIG. 1 is a structural diagram showing the structure of a medical image reading apparatus in the present embodiment.

A medical image reading apparatus of the invention is provided with a control means that controls operations under either one of a first operation mode to execute reading of medical images after order information relating to reading of medical images is inputted and a second operation mode to execute reading of medical images before order information relating to reading of medical images is inputted and with a reading means that conducts reading of medical images based on the control made by the control means.

Incidentally, the medical image reading apparatus may be either an apparatus wherein a reading means and a control means are separate each other, or an embodiment wherein a reading means and a control means are housed integrally in the apparatus. When a reading means and a control means are separate each other, it is preferable that the control means is a computer such as a personal computer. As a reading means, there are given (1) a radiation detector wherein detection elements each outputting electric signals depending on an amount of radiation received are arranged in a matrix form, (2) a combination of a panel generating fluorescence depending on an amount of radiation received and a detector that detects the fluorescence with a photodiode, and (3) a combination of an exciting unit that makes a phosphor panel to absorb radiation and excites the phosphor panel with light or heat energy and a detector that makes radiation energy accumulated in a phosphor by the excitation to radiate as fluorescence and detects the fluorescence. In the case of an embodiment of (3), a radiographing apparatus that makes radiation transmitted through a subject to be absorbed in a phosphor panel and a reading apparatus that excites the phosphor panel to read it may either be separate each other or be united integrally.

When a control means and a reading means are united in an apparatus, it is preferable that the control means is represented by hardware such as customized LSI, gate array, ASIC and IC in which programs relating to control are stored in advance, or by MPU, CPU, ASIC, IC and memory which can execute programs relating to the control. As a reading means, there are given those which are the same as the aforesaid items.

Further, a medical image reading apparatus may either have an inputting means that inputs order information, or have no inputting means so that a separate device for inputting having an inputting means is connected to the medical image reading apparatus through the wire system or a radio system and order information is inputted from the separate device to be sent to the medical image reading apparatus. As an inputting means, there are given a key board, a mouse, a pen-type inputting device and a touch panel. When an inputting means is separated from the medical image reading apparatus, it is preferable that the inputting device is combined with a computer.

It is preferable that order information includes information showing at least a region to be radiographed. In addition to the foregoing, the order information may include a name of a radiographer, the date and hour of radiographing, a name of the patient and a name of the hospital. It is preferable to conduct reading and image processing for images resulted from radiographing by using information concerning reading size, sensitivity and image processing, stored corresponding to information showing radiographed regions registered in advance based on order information. Further, the order information may include information relating to a size for reading, sensitivity and image processing, and these may also be inputted by a user.

Further, a medical image reading apparatus may either have a medical image display means that displays medical images, or have no medical image display means so that a separate device for displaying medical images having a medical image display means is connected to the medical image reading apparatus through the wire system or a radio system and medical image information is sent to the separate device from the medical image reading apparatus to be displayed on the separate device. When the medical image display means is separated from the medical image reading apparatus, it is preferable that the medical image display means is combined with a computer.

It is further preferable that radiographing mode information that shows the radiographing mode used for radiographing in the first and second radiographing modes is added to the medical image information.

The medical image reading apparatus may have a radiographing means that that conducts radiographing for medical images based on control of a control means.

It is also possible to make the first operation mode to be an operation mode that conducts reading after order information relating to reading is inputted and further conducts output of images, and to make the second operation mode to be an operation mode that conducts reading before order information relating to reading is inputted and further conducts output of images after medical images read are displayed. In the second operation mode, medical images read may either be displayed on a medical image display means of the medical image reading apparatus, or be displayed on a separate medical image display device. With regard to medical image output, the output may either be one to display on the medical image display device which is integrated or separated, or be one to output images as a hard copy through other laser imagers.

When reading in the second operation mode, it is also possible to arrange to have a registration means wherein a medical image is read, then, the image thus read is displayed by a display means, and then, the image displayed by operation input by an operator is related with order information that is already inputted. For example, it is also possible to relate the image information with the region information with input of information of the region radiographed or with selection from region information -inputted in advance, after display of the image is conducted in the second operation mode, and to apply the image processing that is appropriate to that region based on the region information. Or, it is also possible to relate image information with patient information with input of information of a patient radiographed or with selection from information of a patient inputted already in advance.

When conducting reading under the second operation mode, it is preferable to make an area of reading conducted by a reading means to be the maximum usable size.

When reading in the second operation mode, it is preferable to use medium sensitivity as reading sensitivity by a reading means, among sensitivities which can be set. The medium sensitivity preferably means sensitivity wherein the signal corresponding to a subject is positioned at the center of a width of signals which can be radiographed, when the region having high frequency of radiographing such as a front side of chest is radiographed with appropriate dose. Incidentally, if the sensitivity is in a range of 80–120% of the sensitivity positioned at the center can be used. When conducting image processing in the second operation mode, it is preferable that at least one type of usable image processing which is usable though it is not optimum is applied independently of a region, without applying the optimum image processing on the specific region. For example, as image processing of that type, there is given normalization wherein accumulated histogram, a mean value and a median value of signal values turn out to be predetermined density. With regard to the histogram, it is possible either to shift the signal value by using one accumulated value so that accumulation 10%, for example, may turn out to be density 0.1 in the case of film output, or to normalize data by using two accumulation values so that accumulation value 10%, for example, may turn out to be density 0.1 in the case of film output, and accumulation value 90% may turn out to be density 2.0.

Further, when a reading means is one wherein exciting light is radiated on a stimulation type phosphor having thereon a latent radiographic image, and fluorescent light of a radiographic image generated from a stimulation type phosphor by irradiation of exciting light is read, when conducting reading in the second operation mode, it is also possible to establish reading sensitivity for regular reading based on information of a radiographic image obtained by pre-reading, by conducting the pre-reading for obtaining information of radiographic image recorded on the stimulation type phosphor prior to regular reading, by radiating exciting light that is weaker than that for the regular reading.

It is preferable that the medical image reading apparatus has therein a display means that conducts key display, a detecting means that detects key input corresponding to the key display, and a key display control means that controls the key display. In this case, it is preferable that the key display control means conducts the control to change a display color of the key or an arrangement of the key display, for each radiographing.

It is also possible to arrange so that a plurality of key display patterns (for example, a list of regions) are prepared in advance, then, key display patterns (region list) are selected by selection in accordance with information relating to a requester of radiographing obtained from the selection of an operator or from the Network to be displayed on the display screen on a selectable basis, and a certain key (prescribe region) is selected from the key display patterns (region list) in accordance with an operator's directive for selection. In this case, as information concerning the requester for radiographing, there are given identification information of requesting department (the internal department, the department of surgery and others) who requested radiographing and identification information of doctors who requested radiographing, to which, however, the invention is not limited. In the concrete example of the foregoing, key display patterns such as lists of regions may be prepared in each of departments (the internal department, the department of surgery and others) and doctors who requested radiographing and issued order information, so that an operator may select from key display patterns such as a plurality of lists of regions, or automatic switching may be made by selecting key display patterns such as region lists with information of the requesting departments or doctor names obtained from the Network.

When the medical image reading apparatus has therein an input means (a detection means) that inputs order information, it is preferable that the aforesaid structure is satisfied. However, it is also possible that the input device that is separate from the medical image reading apparatus has therein the display means, the detecting means and the key display control means.

Incidentally, as the detecting means, there are given a key board, a button, a touch panel, a pen-type input device and a mouse. As the display means, there are given CRT, LCD, organic EL and a plasma-display. As the key display control means, it is preferable that the control means is represented by hardware such as customized LSI, gate array, ASIC and IC in which programs relating to control are stored in advance, or by MPU, CPU, ASIC, IC and memory which can execute programs relating to the control. As a reading means, there are given those which are the same as the aforesaid items. Incidentally, only control means may also be provided separately as a computer.

It is further preferable that a radiographing frequency detection means that detects radiographing frequency is provided.

As a detection means for radiographing frequency, it is preferable to conduct statistical processing from regions and time in order information subjected actually to radiographing or order information registered. For example, in the case of a region for which the frequency of radiographing is not less than a certain value, the priority of the region is raised to be displayed. In the case of a region which was not radiographed for a certain period of time, or a region whose frequency of radiographing is not more than a certain value, the priority of the region is lowered to be displayed. For example, when a key display pattern such as a region menu falls on page break, it is also possible to move to a previous page for raising the priority and to move to a succeeding page for lowering the priority. When the key display pattern such as a region menu is of a layer type, it is also possible to move to an upper layer for raising priority and to move to a lower layer for lowering priority.

It is also possible to arrange so that the key display control means conducts the control to change a display color for key display for each group of regions to be radiographed. When a plurality of reading means are connected, it is also possible to arrange so that the key display control means conducts the control to change a display color for key display for each reading means.

First, an embodiment of the invention will be explained in detail as follows, referring to the drawings. The structure of a medical image reading apparatus in the present embodiment will be explained first.

(First Embodiment)

Structure of a medical image reading apparatus:

FIG. 1 is a system structural diagram showing the overall structure of a medical image reading apparatus. Radiation generator 30 is controlled by controller 10, and radiation radiated from the radiation generator 30 is applied, through subject 5, on image pick-up panel 41 mounted on the front side of radiographic image reader (reader) 40.

In the present embodiment, each of a control means and a reading means is made to be a separate device and they are combined to be a medical image reading apparatus. One having the control means is controller 10 and one having a reading means is radiographic image reader 40. The one wherein the controller 10 and the radiographic image reader 40 are combined is a medical image reading apparatus of the invention.

The control means in the present embodiment represents all structures connected directly to system bus 12 and image bus 13 in FIG. 1. Namely, CPU 11, memory 14, display control section 15, frame memory control section 16 and image processing section 26 represent a control means. These are hardware such as customized LSI, gate array, ASIC and IC in which programs relating to control are stored in advance, and MPU, CPU, ASIC, IC and a memory which can execute programs relating to the control.

Figure 2:
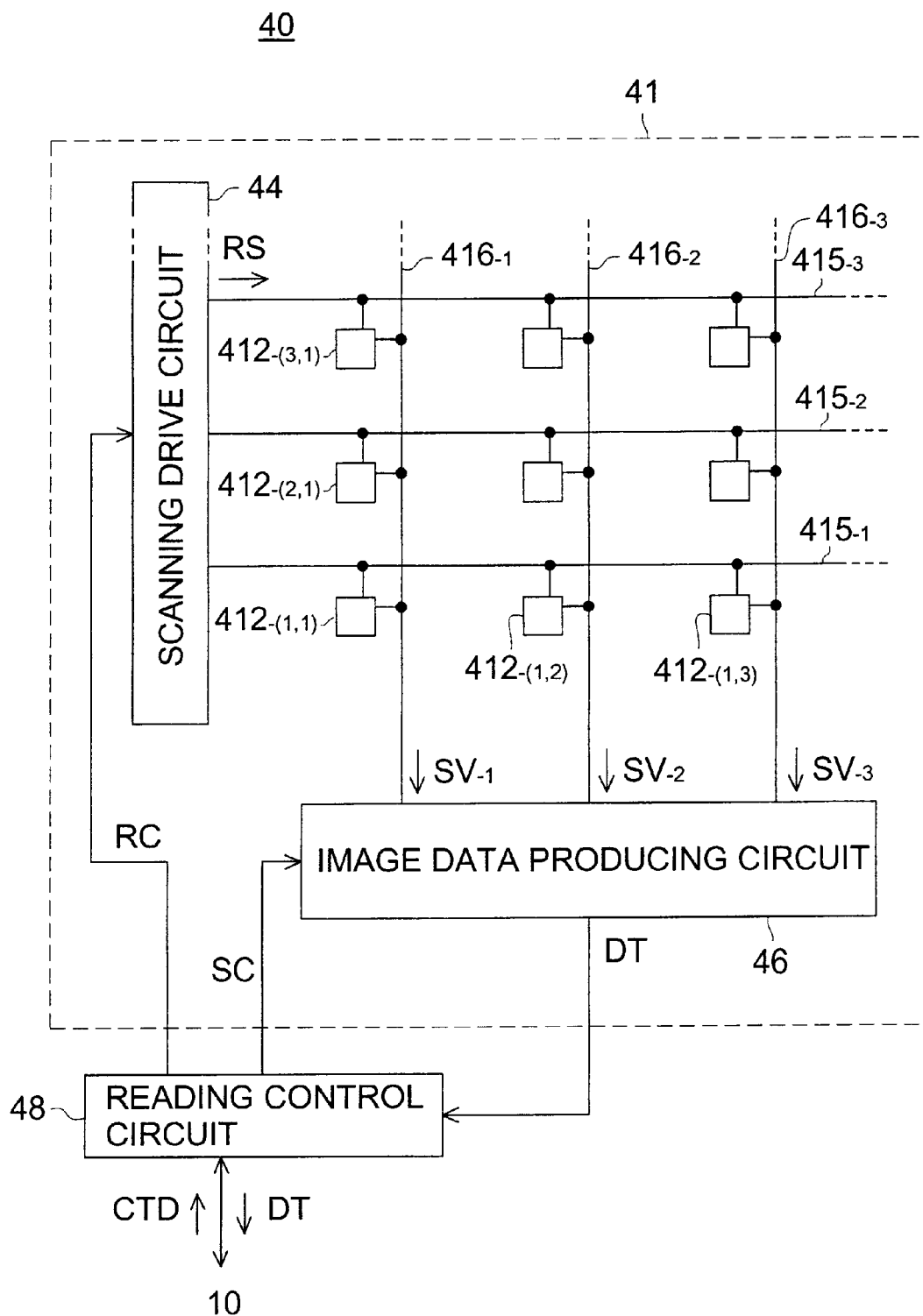
FIG. 2 is a structural diagram showing the structure of a radiographic image reading apparatus in the present embodiment.

Now, the structure of image pick-up panel 41 provided on radiographic image reader 40 will be explained, referring to FIG. 2. This image pick-up panel 41 has a base plate having a thickness with which prescribed rigidity can be obtained, and on the base plate, there are arranged, in a form a matrix and on a two-dimensional way, detection elements 412-(1, 1)-412-(m,n) each outputting electric signals depending on an amount of radiation radiated. Further, scanning lines 415-1 - 415-m and signal lines 416-1-416-n are arranged so that they cross at right angles for example.

Scanning lines 415-1-415-m of image pick-up panel 41 are connected with scanning drive section 44. When reading signal RS is supplied to one scanning line 415-p (p is a given numeral in 1-m) out of scanning lines 415-1-415-m from the scanning drive section 44, electric signal SV-1 SV-n corresponding to an amount of radiation radiated from the detection element connected to scanning line 415-p is outputted to be supplied to image data generating circuit 46 through signal lines 416-1-416-n.

This detection element 412 has only to be one that outputs electric signals corresponding to an amount of radiation radiated. For example, when the detection element is formed by the use of a photoconductive layer wherein paired electron-electron hole are generated and a resistance value is changed when radiation is radiated, electric charges in quantity corresponding to an amount of radiation generated in the photoconductive layer are accumulated in a charge storage capacitor, and electric charges accumulated in the charge storage capacitor are supplied to image data generating circuit as an electric signal. Incidentally, as a photoconductive layer, those having high dark resistance value are preferable, and there are used amorphous selenium, plumbic oxide, cadmium sulfide, mercuric iodide, and organic materials showing photoconductive property (including photoconductive polymer to which X-ray absorption compound is added), and amorphous selenium is especially preferable.

When the detection element 412 is formed by the use of a scintillator that emits fluorescence when it is exposed to radiation, for example, it is also possible to use a photodiode to generate electric signals based on intensity of fluorescence generated in the scintillator and thereby to supply them to image data generating circuit 46.

In image data generating circuit 46, electric signals SV supplied based on output control signal SC from reading control circuit 48 stated later are selected in succession and are converted into digital image data DT. The image data DT are supplied to the reading control circuit 48.

The reading control circuit 48 is connected to controller 10, and it generates scanning control signal RC and output control signal SC based on control signal CTD supplied from controller 10. This scanning control signal RC is supplied to scanning drive section 44, and reading signal RS for scanning lines 415-1-415-m is supplied based on the scanning control signal RC.

Further, output control signal SC is supplied to image data generating circuit 46. When image pick-up element panel 41 is constructed with detection elements 412 in quantity of (m×n), for example, by scanning control signal RC and output control signal SC as stated above, image data DT are generated as an order of data DP(1,1), DP(1,2), . . . DP(1,n), DP(2,1), . . . , DP(m,n), under the assumption that data based on electric signal SV from detection elements 412-(1,1)-412-(m,n) are data DP(1,1)-DP(m,n), and the image data DT are supplied to reading control circuit 48 from image data generating circuit 46. Further, in the reading control circuit 48, there is also conducted processing for sending the image data DT to controller 10.

Image data DT obtained at radiographic image reader 40 are supplied to controller 10 through reading control circuit 48. Incidentally, when supplying image data DT obtained at radiographic image reader 40 to controller 10, if image data subjected to logarithm conversion processing are supplied, it is possible to simplify the processing of image data in the controller 10.

In FIG. 1, system bus 12, image bus 13 and interface 17 are connected to CPU 11 that controls operations of controller 10. The CPU 11 that controls operations of controller 10 is controlled in terms of its operations based on a control program stored in memory 14.

To the system bus 12 and image bus 13, there are connected display control section 15, frame memory control section 16, output interface 18, radiographing control section 19 and disk control section 20, and CPU 11 controls operations of each section by the use of system bus 12, and transmission of image data between sections is conducted through image bus 13.

To frame memory control section 16, there is connected frame memory 21 in which image data obtained at radiographic image reader 40 are stored through radiographing control section 19 and frame memory control section 16. Image data stored in the frame memory 21 are read out and are supplied to display control section 15 and disk control section 20. It is also possible to arrange so that image data supplied from radiographic image reader 40 are stored in the frame memory 21 after they are processed by CPU 11.

To the display control section 15, there is connected image display device 22, and on the image display device 22, there is displayed a radiographic image based on image data supplied to display control section 15. In this case, when the number of pixels displayed by the image display device 22 is smaller than the number of pixels of radiographic image reader 40, it is possible to display all radiographic images on the screen by reading image data on a thinning-out basis. Further, in the case of reading out image data in the area corresponding to the number of pixels displayed by the image display device 22, it is possible to make radiographed images in the desired position to be displayed in detail.

The display control section 15 also controls display to conduct key display corresponding to the key input position on the touch panel of input device 27.

When image data are supplied to disk control section 20 from frame memory 21, the image data are read out continuously to be written in FIFO memory in the disk control section 20, for example, and then, they are recorded in disk device 23 in succession.

It is further possible to supply image data read out of frame memory 21 and image data read out of disk device 23 to outer equipment 100 through outer interface 18.

In image processing section 26, there are conducted radiation field recognition processing for image data DT supplied from radiographic image reader 40 through radiographing control section 19, setting of an area of interest, normalization processing, gradation processing and processing to judge quality of each processing stated above. It is further possible to arrange so that frequency exaggeration processing and dynamic range compression processing are conducted. Incidentally, it is also possible to conduct processing as a structure wherein CPU 11 serves also as image processing section 26.

To input interface 17, there is connected input device 27 such as a touch panel. By operating this input device 27, key input of operations concerning radiographing or reading of medical images is conducted.

In the present embodiment, let it be assumed that an arrangement is made so that display means 27b (not shown) provided right below transparent touch panel 27a (not shown) conducts key display.

As outer equipment 100 connected to output interface 18, there is used a laser exposure device of a scanning type which is also called a laser imager. In the laser exposure device of a scanning type, laser beam intensity is modulated by image data, and a conventional silver halide photographic light-sensitive material or a thermal development silver halide photographic light-sensitive material is exposed to light, then, is subjected to appropriate development processing, and a hard copy for a radiographic image is obtained.

Incidentally, though it has been explained that image data supplied from radiographic image reader 40 are stored in frame memory 21, image data supplied may also be stored after being processed by CPU 11. It is further possible to preserve image data stored in frame memory 21, namely, image data supplied from radiographic image reader 40 and image data obtained by processing the aforesaid image data, together with control information.

Figure 3:
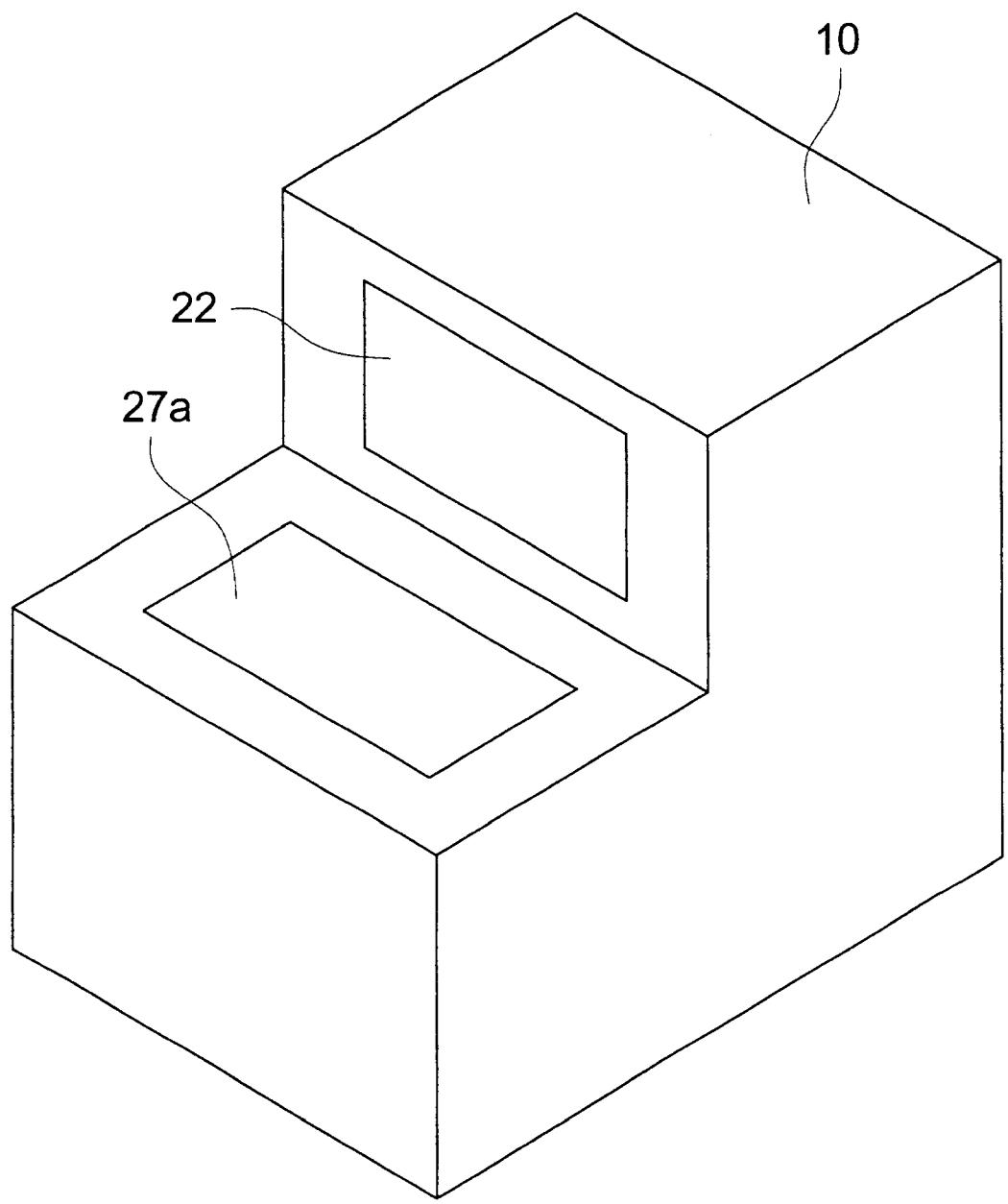
FIG. 3 is an illustration showing an example of the outer structure of an apparatus used in the present embodiment.

FIG. 3 is a schematic structural diagram showing an appearance of the apparatus in the present embodiment. In FIG. 3, there are shown touch panel 27a representing input device 27 on which an operator conducts input of operations, and image display device 22. Incidentally, only a controller having a control means in a medical image reading apparatus of the invention is shown in FIG. 3, and a reading means is not shown.

Incidentally, the structure in the present embodiment stated above represents a radiographing apparatus wherein image data DT obtained by radiographing by the use of image pick-up panel 41 are reciprocally transmitted electrically. In contrast to this, there is available a radiographic image system wherein a radiographing device conducts radiographing by the use of a cassette that houses a film, and reading is conducted by a reader. Even in the case of the radiographic image system of this type, it is possible to apply the embodiment of the invention. Incidentally, in the case of the system to read with a reader, the present embodiment makes it possible to obtain its effect, in particular, when a plurality of readers are present. (First embodiment) In this first embodiment, there will be explained a system wherein a period of time up to the start of radiographing including the time for inputting order information can be shortened in the case of urgent radiographing.

In the past, a long period of time has been required until the start of actual radiographing because it has been necessary to input order information such as names of regions to be radiographed and image processing conditions about regions to be radiographed, before radiographing, which has been a problem.

Therefore, the present embodiment employs the following structure. Incidentally, in the present embodiment, there will be explained an example an apparatus wherein an X-ray image detector and a reading device are united integrally as shown in FIG. 1.

First, the apparatus is used to radiograph a patient for a plurality of images. Then, a mode is switched from an ordinary radiographing mode (first radiographing mode in Structure) to an urgent radiographing mode (second radiographing mode in Structure) through input device 27. When a mode is switched to this urgent radiographing mode, CPU 11 starts reading operations under the condition that order information for radiographing has not been inputted from input device 27)

Figure 8:
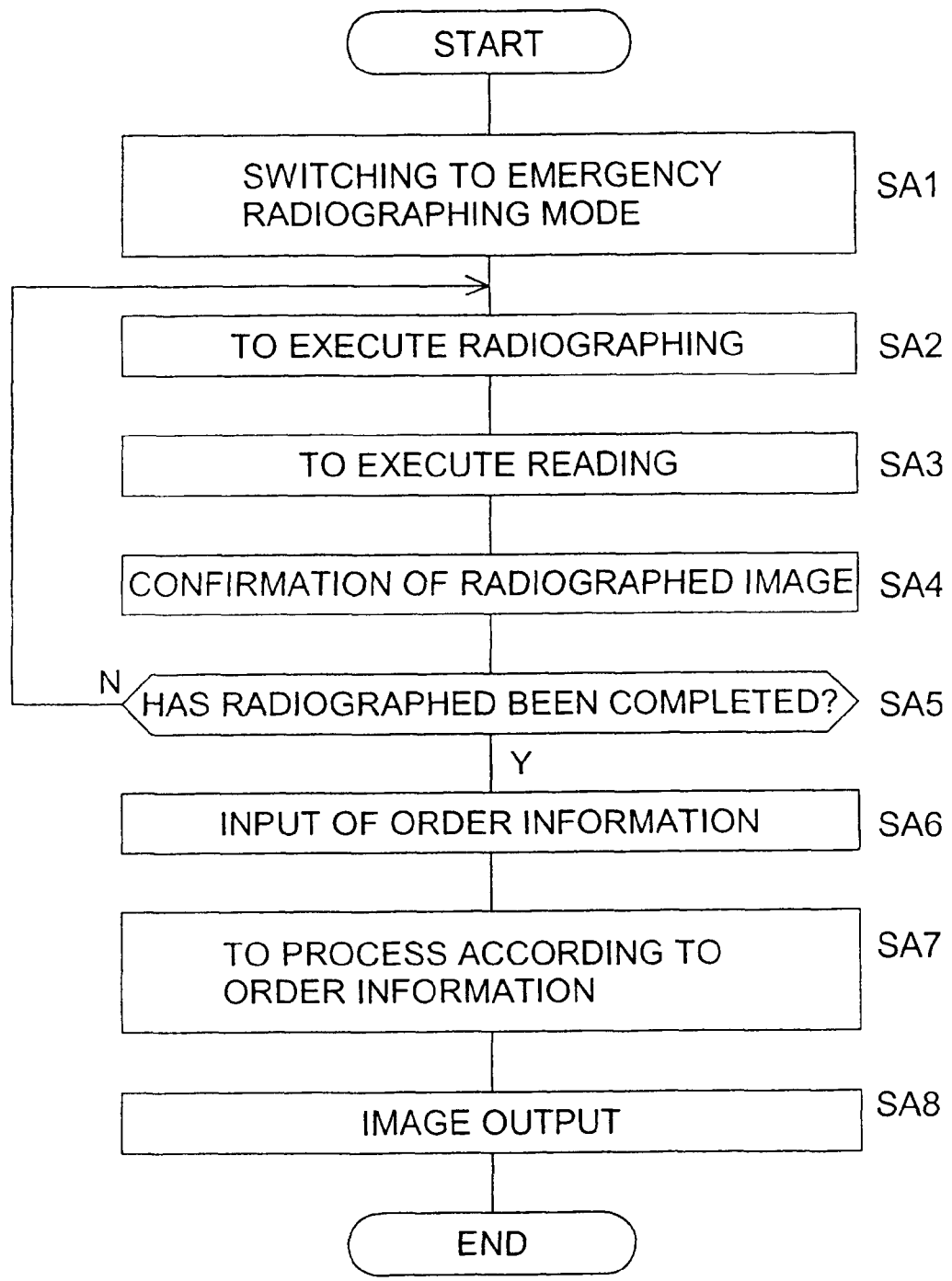
FIG. 8 is a flow chart showing operations in the second embodiment.

Namely, radiographing is conducted (FIG. 8 SA2) after switching to the urgent radiographing mode (FIG. 8 SA1), and X-ray images are read by radiographic image reader 40 (FIG. 8 SA3). Conditions for reading at this point of time are made to be conditions with high versatility because of the state of no order information. For example, a reading area is made to be the maximum size usable in the apparatus. With regard to other conditions, they are made to be conditions which can cover various states.

Then, tentative image processing is applied so that it may be possible to confirm whether radiographing has been conducted at an accurate position or not (FIG. 8 SA4). Then, under the condition that this tentative image processing has been applied, images are displayed on image display apparatus 22 for confirming the position for radiographing.

Radiographing, reading and image confirmation stated above are repeated for the number of radiographing sheets required (FIG. 8 SA5).

After completion of radiographing for necessary images, order information is inputted for each image (FIG. 8 SA6). In this order information, names of regions to be radiographed, optimum image processing conditions and output conditions for the image output for the regions are set. Based on this order information, image processing is conducted (FIG. 8 SA7) and outputted to a printer or a network (FIG. 8 SA8).

By operating in the procedures stated above, it is possible to shorten substantially the time (total radiographing time) up to the moment when a patient leaves a radiographing room, even when the time for radiographing again for failure of radiographing is included.

By inputting order information after radiographing, it is possible to radiograph in free order without determining the order of radiographing in advance. Therefore, when it is necessary, for easy radiographing, to change the radiographing order on the half way because a change of position is difficult depending on the patient condition, the order can be changed easily. (Second embodiment) There is further available a radiographic image system wherein a cassette that houses therein a film is used to radiograph with a radiographing device and a reader is used for reading. In the case of this radiographic image system, when a plurality of cassettes are used, order information input, radiographing and reading are conducted in this order, but radiographing and reading are conducted in a separate apparatus, which results in a problem that correspondence between each cassette and each radiographing is not clear.

In the second embodiment, therefore, there is realized a medical image reading apparatus wherein contents of plural cassettes subjected to radiographing are grasped and order information can be inputted.

Figure 9:
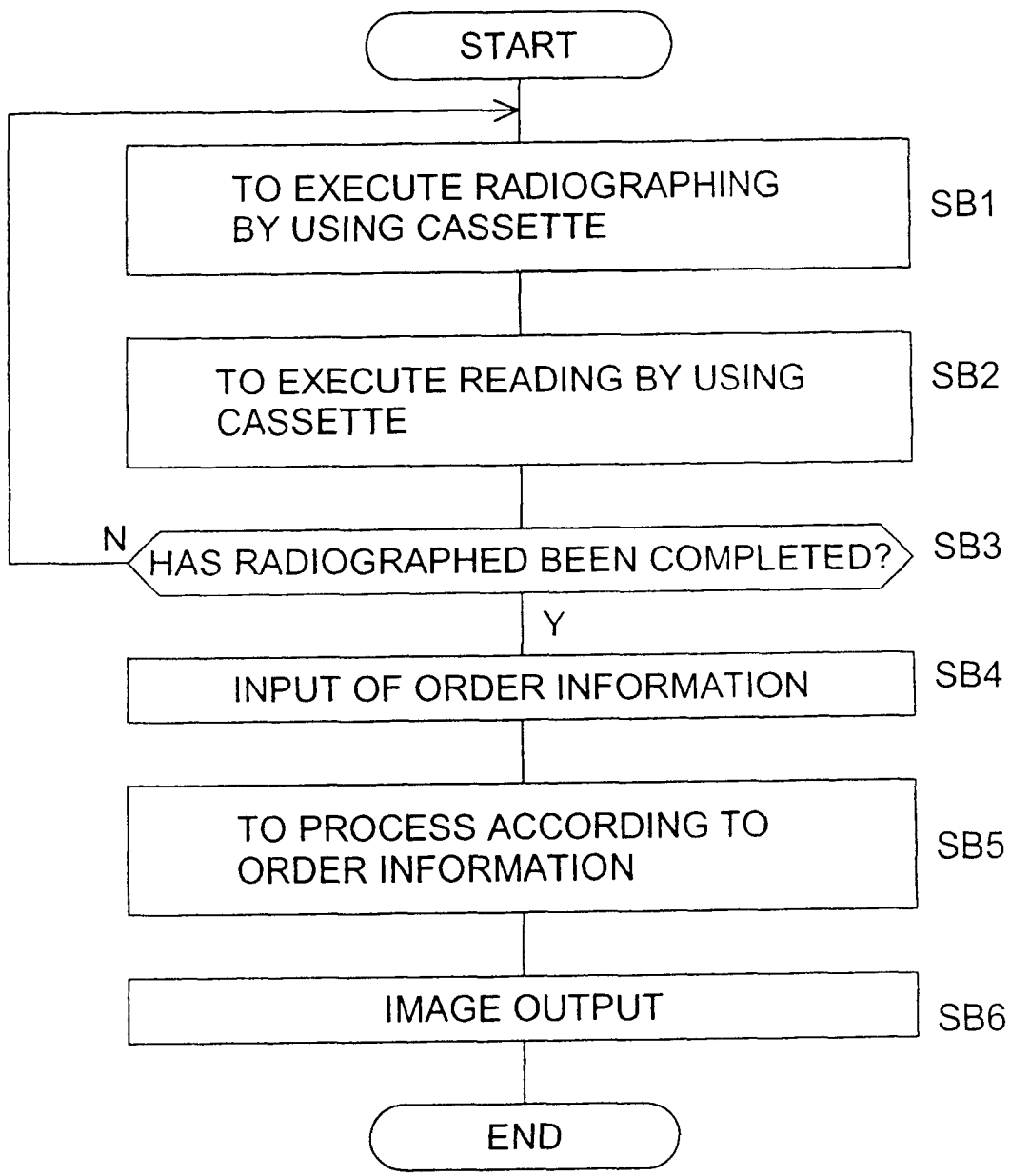
FIG. 9 is a flow chart showing operations in the third embodiment.

Radiographing is conducted in the radiographing apparatus by the use of plural or single cassette (FIG. 9 SB1). Then, reading is conducted by the cassette in the reading apparatus (FIG. 9 SB2). Conditions for reading in this case are made to be those with high versatility. For example, a reading area is made to be the maximum size usable in the apparatus or the same size as the cassette.

Incidentally, tentative image processing is applied so that it may be possible to confirm whether radiographing has been conducted at an accurate position or not. The radiographing and reading stated above are repeated for the number of sheets required (FIG. 9 SB3).

After completion of radiographing for necessary images, order information is inputted for each image (FIG. 9 SB4). In this order information, there is establishment for names of regions to be radiographed and for optimum image processing and output for the regions.

Based on this order information, image processing is conducted (FIG. 9 SB5) and outputted to a printer or a network (FIG. 9 SB6).

By operating in the procedures stated above, it is possible to shorten substantially the time (total radiographing time) up to the moment when a patient leaves a radiographing room, even when the time for radiographing again for failure of radiographing is included.

In the past, when a single radiographing for the front of a chest and a single radiographing for the side of a chest are conducted for the same patient, strict control for the correlation between the cassette and the image type has been required. However, by using the procedures mentioned above, even when the correlation between the cassette and the image type is unclear, it is possible to confirm it after radiographing and reading, and thereby to output by inputting order information.

Namely, even when a plurality of cassettes are used, it is possible to grasp the contents of the plural cassettes subjected to radiographing, by reading and confirming the contents of radiographing, and thereby to input order information. (Third embodiment) Operations of a medical image reading apparatus:

Now, operations of the medical image reading apparatus of the aforesaid structure will be explained as follows, referring to a flow chart in FIG. 4 and illustrations in FIG. 5 and thereafter. Incidentally, FIG. 5 and thereafter represent an illustration showing an example of display of the state wherein key display is conducted corresponding to the position of key input on a touch panel of input device 27.

Figure 4:
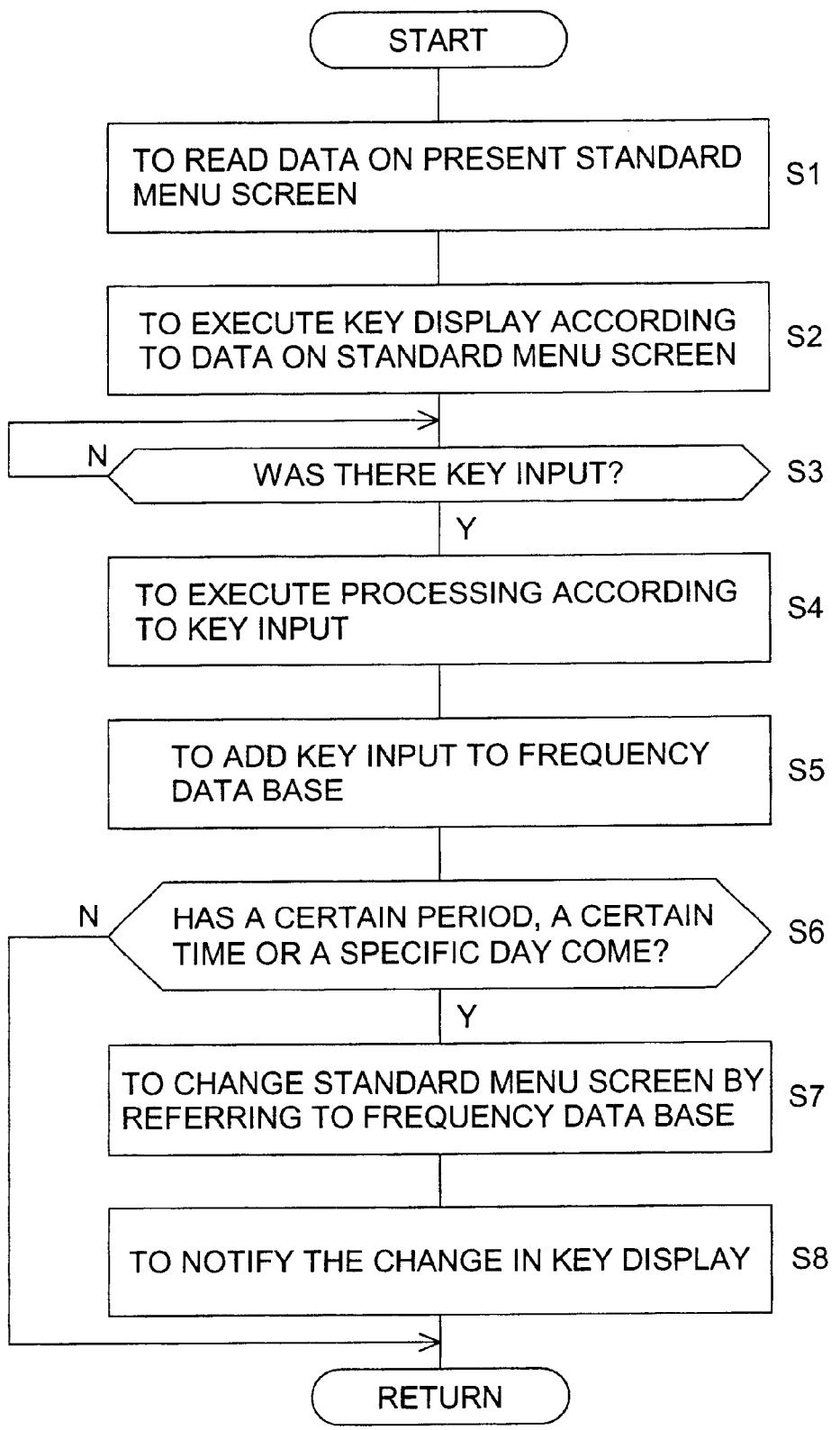
FIG. 4 is a flow chart showing operations in the first embodiment.

First, at a point of time when the power supply for the apparatus is turned on, CPU 11 reads data of standard menu screen stored presently in memory 14 (FIG. 4 S1). The data of standard menu screen in this case are data of correspondence relationship between a key name and a display position for conducting name display (key display) of each key corresponding to key input position on touch panel 27a (not shown).

Then, CPU 11 conducts key display with display means 27b (not shown) provided right below touch panel 27a, in accordance with data of standard menu screen which have been read (FIG. 4 S2).

FIG. 5 shows an example of a radiographing condition setting screen based on key display according to data of standard menu screen in the initial condition (condition at shipment of the apparatus) when the data are not yet changed by frequency of usage.

In this case, the following items are displayed on the radiographing condition setting screen;

Rough grouping of regions to be radiographed (head region, neck region, chest region, abdominal region, backbone, thorax, upper limb, lower limb and others)

Group of regions to be radiographed (Concrete regions belonging to rough grouping: skull, sella tursica, paranasal sinus, acoustic organ, optic canal, etc., if rough grouping is head region)

Various radiographing conditions (Radiographing direction, radiographing angle, presence of contrasting)

In this initial state, there are displayed candidates of rough grouping, a group of regions to be radiographed about head region representing a top in rough grouping, and candidates of radiographing conditions for radiographing head region.

If there is key input conducted by an operator, CPU 11 takes in a key code corresponding to the key input, or input position data, through input interface 17. Then, CPU 11 executes processing in accordance with the key input (FIG. 4 S3). In the case of this embodiment, setting for radiographing is executed in accordance with key input.

Then, every time each key input is conducted, CPU 11 updates frequency data base concerning key input (FIG. 4 S4 and S5).

In this case, data of year, month, date and time in addition the type of key input are stored in the data base, corresponding to the types of key input.

In this case, if there are present key input that is high in terms of frequency at intervals of a certain period of time, key input that is high in terms of frequency on a specific day (Friday at the end of the month, Friday early in the month), key input that is high in terms of frequency at the specific time (earliest in the morning, earliest in the afternoon), key input that is high in terms of frequency at intervals of a certain period of time, and key input that is high in terms of frequency for a specific operator, CPU 11 outputs key input of high frequency as a table together with the corresponding conditions (a certain period of time, specific date, specific time, specific operator), in accordance with a data base processing program.

Then, when conditions (passage of a certain period of time, corresponding to a specific date, corresponding to a specific time, specific operator in operation) corresponding to the table agree (YES in FIG. 4 S6), a standard menu screen is changed according to frequency so that the key input with high frequency may come to the forefront of plural screens, or a color may be changed according to the frequency (FIG. 4 S7 and S8).

FIG. 6 shows an example of data of standard menu screen made newly by CPU 11 by judging that frequency of specific key input (skull: A→P, P→A, LAT, paranasal sinus: P→A, LAT) in a certain period of time is high, and by changing display color. In this case, a difference in display colors is shown illustratively with hatching, and it is preferable that a key with high frequency is displayed with a noticeable color, a bright color, or with flashing display.

FIG. 7 shows an example of data of standard menu screen made newly by CPU 11 by judging that frequency of specific key input (skull: A→P, P→A, LAT, paranasal sinus: P→A, LAT) in a certain period of time is high, and by changing further an arrangement after changing a display color (see FIG. 6). In this case, there is shown an example wherein a difference in display colors is shown illustratively with hatching, and a key with high frequency is displayed with a noticeable color, a bright color, or with flashing display, and is displayed on the forefront of plural screens or on the upper portion of the same screen collectively.

Since a display color of key display or an arrangement of key display is changed for each specific month, week, day of the week and time zone, with the standard frequency of radiographing obtained by calculating automatically for each specific month, week, day of the week and time zone, as stated above, an item with high radiographing frequency is displayed with a specific color or displayed on the forefront of plural screens, which makes key input concerning radiographing and reading to be easy.

When a display color or an arrangement for key display is changed as stated above, CPU 11 notifies an operator with a sound or on the screen (FIG. 4 S8). Since there is provided a function to notify that a change of a display color or an arrangement for key display is made automatically, an operator can learn surely whether key display is changed or not.

Incidentally, the following embodiment can be considered as a variation of key display in the foregoing.

(1) Control to change a display color for key display for each group of regions to be radiographed is executed. By changing a display color for key display for each group of regions to be radiographed as stated above, it is possible to grasp easily a group of regions to be radiographed and thereby, a target region to be radiographed can be discovered easily, which makes key input concerning radiographing and reading to be easy.

(2) When a plurality of readers are connected, there is executed control to change a display color for key display for each reader. By doing this, it is possible to grasp easily distinction between a plurality of readers by changing a display color for key display for each reader, and thereby, a reader in a target can be discovered easily, which makes key input concerning radiographing and reading to be easy.

(3) There is executed control to change a display color for key display for each frequency of radiographing. By doing this and by changing a display color for key display for each frequency of radiographing, an item with high frequency of radiographing is displayed on the forefront of plural screens, which makes key input concerning radiographing and reading to be easy.

(4) The frequency of radiograping stated above in a certain period of time is calculated periodically, and control to change a key display color is executed. By doing this and by changing a display color for key display for each frequency of radiographing obtained by automatic calculation in a prescribed period, an item with high frequency of radiographing in the corresponding prescribed period is displayed on the forefront of plural screens, which makes key input concerning radiographing and reading to be easy.

(5) The frequency of radiographing stated above is calculated periodically for each prescribed month, week, day of the week and time zone and control to change a key display color for each prescribed month, week, day of the week and time zone is executed. By changing a display color for key display for each prescribed month, week, day of the week and time zone with the standard of frequency of radiographing obtained by calculating automatically for each specific month, week, day of the week and time zone, as stated above, an item with high radiographing frequency is displayed on the forefront of plural screens, which makes key input concerning radiographing and reading to be easy.

(6) There is executed control to change an arrangement of key display for each frequency of radiographing. By changing an arrangement of key display corresponding to the frequency of radiographing, it is possible to discover a region to be radiographed with high frequency easily. Accordingly, key input relating to radiographing and reading turns out to be easy. Incidentally, it is also preferable to execute an change of key display corresponding to the frequency of radiographing for each operator.

(7) The frequency of radiograping in a prescribed period stated above is calculated periodically, and control to change an arrangement of key display is executed. By doing this and by changing an arrangement of key display for each frequency of radiographing obtained by calculating automatically in a prescribed period, an item with high frequency of radiographing in the corresponding prescribed period is displayed on the forefront screen of plural screens, which makes key input relating to radiographing and reading to be easy.

(8) The frequency of radiographing stated above is calculated periodically for each prescribed month, week, day of the week and time zone and control to change an arrangement of key display for each prescribed month, week, day of the week and time zone is executed. By doing this and by changing an arrangement of key display for each prescribed month, week, day of the week and time zone with the standard of frequency of radiographing obtained by calculating automatically for each specific month, week, day of the week and time zone, an item with high radiographing frequency in that period is displayed on the forefront screen of plural screens, which makes key input concerning radiographing and reading to be easy.

(Other Embodiment)

There also is an occasion wherein screen display is conducted through communication from cassette insertion, completion of radiographing and an information system in a hospital. In that case, an operator is not required to conduct key input, and the operator has only to press an "OK" button.

Therefore, an embodiment of the invention includes also a medical image reading apparatus provided with a display means that conducts key input which can cope with operations of radiographing or reading for medical images, a control means which controls radiographing or reading for medical images based on the operations and controls key display on a display means, and with an executing means which executes radiographing or reading for medical images based on the control of a control means.

As explained in detail above, a display color for key display is changed automatically for each group or regions to be radiographed. It is therefore possible to grasp a mass of groups of regions to be radiographed and to discover easily a target region to be radiographed, which makes key input concerning radiographing and reading to be easy, without conducting special setting.

Since an arrangement of key display is automatically changed in accordance with frequency of radiographing in the invention, regions to be radiographed having high radiographing frequency can be discovered easily. Therefore, key input concerning radiographing and reading is made to be easy, without conducting special setting.

Since radiographing and reading are executed before order information relating to reading is inputted in the invention, a period of time up to the start of radiographing including the time for inputting order information can be shortened in the case of urgent radiographing.

Further, in the invention, radiographing and reading are executed before order information relating to reading is inputted, and image outputting is conducted after confirmation of medical images which have been read. Therefore, even when a plurality of cassettes are used, it is possible to grasp the contents of plural cassettes subjected to radiographing and thereby to input order information, by reading and confirming the contenst of radiographing.

Disclosed embodiment can be varied by a skilled person without departing from the spirit and scope of the invention.

What is claimed is:

1. A medical image reading apparatus comprising:
   a reader to acquire a medical image; and
   a controller to selectively operate in a first operation mode in which order information, including at least one of body parts information and patient information, are inputted into the medical image reading apparatus before the medical image is acquired by the reader, and in a second operation mode in which order information are inputted after the medical image is acquired by the reader.

2. The medical image reading apparatus of claim 1, further comprising:
   a radiographing device to conduct radiographing the medical image based on the operation control by the controller.

3. The medical image reading apparatus of claim 1, wherein the first operation mode is an operation mode to execute reading the medical image after the order information with regard to the reading the medical image is inputted and to further conduct outputting an image of the medical image and the second operation mode is an operation mode to execute reading the medical image before the order information with regard to the reading the medical image is inputted and to further conduct outputting an image of the medical image after displaying the read medical image.

4. The medical image reading apparatus of claim 1, wherein the reader has a reading region whose size is changeable, and when the reader conducts reading on the second mode, the reader uses the largest usable reading region.

5. The medical image reading apparatus of claim 1, further comprising:
   a displaying device to conduct a key display;
   a detector to detect a key input corresponding to the key display; and
   a key display controller to control the key display by the display, wherein the key display controller executes a control to change an arrangement of the key display for each radiographing frequency.

6. The medical image reading apparatus of claim 5, wherein the key display controller calculates periodically the radiographing frequency in a predetermined period and executes the control to change the arrangement of the key display.

7. The medical image reading apparatus of claim 6, wherein the key display controller calculates periodically the radiographing frequency for each of at least one of a predetermined month, a predetermined week, a predetermined day of a week and a predetermined time and executes the control to change the arrangement of the key display.

8. The medical image reading apparatus of claim 5, further comprising:
   a notifying device to notify the change in the arrangement of the key display, wherein the notifying device notifies the change in the arrangement of the key display when the key display controller executes the control to change the arrangement of the key display.

9. The medical image reading apparatus of claim 1, further comprising:
   a displaying device to conduct a key display;
   a detector to detect a key input corresponding to the key display; and
   a key display controller to control the key display by the display, wherein the key display controller executes a control to change a color display of the key display for each radiographing frequency.

10. The medical image reading apparatus of claim 9, wherein the key display controller calculates periodically the radiographing frequency in a predetermined period and executes the control to change the color display of the key display.

11. The medical image reading apparatus of claim 10, wherein the key display controller calculates periodically the radiographing frequency for each of at least one of a predetermined month, a predetermined week, a predetermined day of a week and a predetermined time and executes the control to change the color display of the key display.

12. The medical image reading apparatus of claim 9, further comprising:
   a notifying device to notify the change in the color display of the key display, wherein the notifying device notifies the change in the color display of the key display when the key display controller executes the control to change the color display of the key display.

13. The medical image reading apparatus of claim 1, further comprising:
   a displaying device to conduct a key display;
   a detector to detect a key input corresponding to the key display; and a key display controller to control the key display by the display, wherein the key display controller executes a control to change a color display of the key display for each group of sections to be radiographed.

14. The medical image reading apparatus of claim 1, further comprising:

a displaying device to conduct a key display;

a detector to detect a key input corresponding to the key display; and a key display controller to control the key display by the display, wherein the key display controller executes a control to change a color display of the key display for each reader.

15. The medical image reading apparatus of claim 1, wherein when the reading is conducted on the second operation mode, a medium sensitivity is used among possible settable sensitivities as a reading sensitivity of the reader.

16. The medical image reading apparatus of claim 1, wherein in the case that an image processing is conducted after the reading is conducted on the second operation mode, at least one kind of usable image processing is conducted regardless of a section to be radiographed.

17. The medical image reading apparatus of claim 1, wherein the reader reads fluorescent light of a radiation image emitted from a phosphor sheet by irradiating an exciting beam on the phosphor sheet bearing a latent image of the radiation image, and wherein when the reading is conducted on the second mode, a preliminary reading is firstly conducted in advance to a primary reading so as to obtain information of the radiation image recorded in the phosphor sheet by irradiating an exciting beam weaker than that used in the primary reading, and a reading sensitivity of the primary reading is set based on the information of the radiation image obtained by the preliminary reading.

18. The medical image reading apparatus of claim 1, wherein a sensitivity of the reader for acquiring the medical image is settable; and wherein, in the first operation mode, the sensitivity of the reader is set at a value in accordance with the body parts information inputted before the medical image is acquired by the reader, and in the second operation mode, the sensitivity of the reader is set at a predetermined valued determined in advance.

19. The medical image reading apparatus of claim 1, wherein the controller comprises an image-processing section to apply an image-processing to the medical image acquired by the reader; and wherein, in the first operation mode, the image-processing is applied to the medical image acquired by the reader based on a parameter of the image- processing, which is determined in accordance with body parts information inputted before the medical image is acquired by the reader, and in the second operation mode, the image-processing is applied to the medical image acquired by the reader based on a predetermined parameter of the image-processing, which is determined in advance.

* * * * *

UNITED STATES PATENT AND TRADEMARK OFFICE
CERTIFICATE OF CORRECTION

PATENT NO. : 6,548,823 B2
DATED : April 15, 2003
INVENTOR(S) : Sumiya Nagatsuka et al.

It is certified that error appears in the above-identified patent and that said Letters Patent is hereby corrected as shown below:

Column 24,
Line 15, "valued" should read -- value --.
Line 23, "image- processing," should read -- image-processing, --.

Signed and Sealed this

Ninth Day of December, 2003

JAMES E. ROGAN
*Director of the United States Patent and Trademark Office*